US012803778B2

(12) United States Patent
Lee et al.

(10) Patent No.: US 12,803,778 B2
(45) Date of Patent: Nov. 17, 2026

(54) METHOD FOR PROCESSING HOMOMORPHIC ENCRYPTION AND ELECTRONIC APPARATUS

(71) Applicant: CRYPTO LAB INC., Seoul (KR)

(72) Inventors: Seewoo Lee, Chungju-si (KR); Garam Lee, Seoul (KR); Jung Woo Kim, Seoul (KR); Junbum Shin, Suwon-si (KR)

(73) Assignee: CRYPTO LAB INC., Seoul (KR)

( * ) Notice: Subject to any disclaimer, the term of this patent is extended or adjusted under 35 U.S.C. 154(b) by 51 days.

(21) Appl. No.: 18/428,172

(22) Filed: Jan. 31, 2024

(65) Prior Publication Data

US 2024/0259179 A1 Aug. 1, 2024

(30) Foreign Application Priority Data

Jan. 31, 2023 (KR) ........................ 10-2023-0013179
Jan. 29, 2024 (KR) ........................ 10-2024-0013335

(51) Int. Cl.
*H04L 9/00* (2022.01)

(52) U.S. Cl.
CPC .................................... *H04L 9/008* (2013.01)

(58) Field of Classification Search
CPC ........................................................ H04L 9/008
See application file for complete search history.

(56) References Cited

U.S. PATENT DOCUMENTS 11,276,001 B1 * 3/2022 Sutherland ............. G16H 40/67
11,551,035 B2 1/2023 Schneider et al.
11,842,541 B1 * 12/2023 Carvalho ............... G06V 10/82
12,056,582 B2 * 8/2024 Ren ........................ H04L 9/3073
12,149,510 B1 * 11/2024 Storm ...................... G06F 18/24
2020/0358599 A1 * 11/2020 Baracaldo Angel .......................... G06F 21/6227
2021/0398017 A1 * 12/2021 Garg ......................... H04L 9/50
(Continued)

OTHER PUBLICATIONS

Jiang, X. et al., "Secure Outsourced Matrix Computation and Application to Neural Networks" Proceedings of the 2018 ACM SIGSAC Conference on Computer and Communications Security (CCS '18), Oct. 2018. pp. 1209-1222. 14 pages.
(Continued)

*Primary Examiner* — Meng Li
(74) *Attorney, Agent, or Firm* — Steinfl + Bruno LLP

(57) ABSTRACT

Disclosed is an electronic apparatus. The electronic apparatus includes: a memory configured to store a training model trained using a plurality of training data; a communication device configured to perform communication with an external device; and a processor, in which the processor is configured to control the communication device to extract a feature of the training model, and homomorphically encrypt the extracted feature and transmit the homomorphically encrypted feature to a server apparatus, control the communication device to homomorphically encrypt the plurality of training data and transmit the homomorphically encrypted training data to the server apparatus, and when a homomorphically encrypted calculation result is received from the server apparatus, control the communication device to decrypt the received calculation result and transmit information on a training state corresponding to the decrypted value to the server apparatus.

20 Claims, 15 Drawing Sheets

(56) References Cited

U.S. PATENT DOCUMENTS

| | | | | |
|---|---|---|---|---|
| 2023/0316127 | A1* | 10/2023 | Ward | H04L 9/008<br>706/12 |
| 2023/0394516 | A1* | 12/2023 | Ambite Molina | G06N 3/098 |
| 2024/0135254 | A1* | 4/2024 | Narasimhan | G06N 5/04 |
| 2024/0169256 | A1* | 5/2024 | Gong | G06N 3/0985 |
| 2024/0195826 | A1* | 6/2024 | Mathews | G06N 20/20 |
| 2024/0232352 | A1* | 7/2024 | Mariappan | G06F 21/602 |
| 2024/0259179 | A1* | 8/2024 | Lee | H04L 9/008 |
| 2025/0111277 | A1* | 4/2025 | Choi | G06F 18/214 |
| 2025/0202679 | A1* | 6/2025 | Huang | G06N 3/096 |

OTHER PUBLICATIONS

Jin, C. et al., Secure Transfer Learning for Machine Fault Diagnosis under Different Operating Conditions. Institute for Infocomm Research, ASTAR, Singapore. Dec 1, 2020. 20 pages.

Korean Office Action issued for KR Application No. 10-2024-0013335 filed on Jan. 29, 2024 on behalf of Crypto Lab Inc. Mail Date: May 26, 2026. (English + Original) 14 Pages.

Lee, G. et al., "Privacy-Preserving Text Classification on BERT Embeddings with Homomorphic Encryption" Proceedings of the 2022 Conference of the North American Chapter of the Association for Computational Linguistics: Human Language Technologies, Jul. 2022. pp. 3169-3175. 7 pages.

* cited by examiner

FIG. 7

---

Algorithm 2 DiagABT: Homomorphic evaluation of $tAB^{\intercal}$

---

Input: $\langle A\rangle$, $\langle\overline{B}\rangle$, for $A \in \mathbb{R}^{a\times b}$, $B \in \mathbb{R}^{c\times b}$, $1 < c \leq s_0$, and $t \in \mathbb{R}$

Output: $\langle tA\overline{B}^{\intercal}\rangle$

1: $B_{\mathsf{cplx}} = \langle\overline{B}\rangle + \sqrt{-1}\,\mathsf{RotUp}(\langle\overline{B}\rangle, c/2)$
2: for $0 \leq k < \frac{c}{2}$ do
3: $\quad B_k = \mathsf{RotUp}(B_{\mathsf{cplx}}, k)$
4: $\quad R_k = \langle A\rangle \odot B_k$
5: $\quad R_k = \mathsf{SumCols}(R_k)$
6: $\quad R_k = R_k \odot tM_{\mathsf{cplx}}^{(k,c)}$
7: end for
8: $X = \sum_{0\leq k<c/2} R_k$
9: $\langle tA\overline{B}^{\intercal}\rangle = X + \mathsf{Conj}(X)$

---

FIG. 8

Algorithm 3 $\mathsf{RotLeft}(\langle A\rangle, k)$

Input: $\langle A\rangle$ where $A \in \mathbb{R}^{a\times s_1}, 0 \le k < s_1$
Output: $\mathsf{RotLeft}(\langle A\rangle, k)$ 1: $D_k = (d_{ij})$ where $$d_{ij} = \begin{cases} 1 & 0 \le j < s_1 - k \\ 0 & \text{otherwise} \end{cases}$$

2: $A_1 = \mathsf{Lrot}(\langle A\rangle, k)$
3: $A_2 = A_1 \odot \langle D_k\rangle$
4: $\mathsf{RotLeft}(\langle A\rangle, k) = A_2 + \mathsf{Rrot}(A_1 - A_2, s_1)$

FIG. 9

Algorithm 4 $\mathsf{PRotUp}(B, k)$

Input: $\langle B \rangle$ for $B \in \mathbb{R}^{a \times b}$, $0 \leq k < s_1$

Output: $\mathsf{PRotUp}(B, k)$

1: $D_k = (d_{ij})$ where $$d_{ij} = \begin{cases} 1 & 0 \leq j < s_1 - k \\ 0 & \text{otherwise} \end{cases}$$

2: $B' = \langle B \rangle \odot \langle D_k \rangle$

3: $\mathsf{PRotUp}(B, k) = B' + \mathsf{RotUp}(\langle B \rangle - B', 1)$

FIG. 10

Algorithm 5 DiagATB: Homomorphic evaluation of $tA^{\intercal}B$

Input: $\langle \overline{A} \rangle$, $\langle B \rangle$, for $A \in \mathbb{R}^{a \times c}$, $B \in \mathbb{R}^{a \times b}$, and $t \in \mathbb{R}$

Output: $\langle t\overline{A}^{\intercal} B \rangle$ $\overline{A}_{\mathsf{cplx}} = \langle \overline{A} \rangle + \sqrt{-1}\,\mathsf{RotLeft}(\langle \overline{A} \rangle, c/2)$
for $0 \le k < \frac{c}{2}$ do
  if $\mathsf{level}(A) < \mathsf{level}(B)$ then
    $A_k = \mathsf{Lrot}(\overline{A}_{\mathsf{cplx}}, k)$
    $B_k = \mathsf{PRotUp}(\langle B \rangle, k)$
    $R_k = A_k \odot B_k$
  else
    $A_k = \mathsf{RotLeft}(\overline{A}_{\mathsf{cplx}}, k)$
    $R_k = A_k \odot \langle B \rangle$
  end if
  $R_k = \mathsf{SumRows}(R_k)$
  $R_k = R_k \odot tM_{\mathsf{cplx}}^{(-k,a)}$
end for
$X = \sum_{0 \le k < b/2} R_k$
$\langle t\overline{A}^{\intercal} B \rangle = X + \mathsf{Conj}(X)$

METHOD FOR PROCESSING HOMOMORPHIC ENCRYPTION AND ELECTRONIC APPARATUS

CROSS-REFERENCE TO RELATED APPLICATION(S)

This application is claiming priority under of a Korean patent application number 10-2023-0013179, filed on Jan. 31, 2023, in the Korean Intellectual Property Office and a Korean patent application number 10-2024-0013335, filed on Jan. 29, 2024, in the Korean Intellectual Property Office, the disclosure of which is incorporated by reference herein in its entirety.

BACKGROUND

Field

The present disclosure relates to a method for processing homomorphic encryption and an electronic apparatus, and more particularly, to a method for processing homomorphic encryption and an electronic apparatus capable of training a neural network model without exposure to training data.

Description of the Related Art

As communication technology develops and the spread of electronic apparatuses becomes more popular, efforts are continuously made to maintain communication security between the electronic apparatus. Accordingly, encryption/decryption technology is used in most communication environments.

When messages encrypted by the encryption technology are delivered to the other party, the other party needs to perform decryption to use the messages. In this case, the other party wastes resources and time during decrypting the encrypted data. In addition, when the third party hacks messages while the other party temporarily decrypts the messages for calculation, there is a problem in that the messages may be easily leaked to the third party.

In order to solve this problem, a homomorphic encryption method is being studied. According to the homomorphic encryption, even if calculation is performed on an encrypted message itself without decrypting the encrypted information, it is possible to obtain the same result as a value encrypted after the calculation on a plain text. Accordingly, various types of calculations may be performed without decrypting the encrypted message.

Meanwhile, in recent years, various inferences and calculations have been performed using neural network models, and in a state in which personal information is protected by applying homomorphic encryption during the use of the above-described neural network models, various methods capable of using the neural network models have been provided.

However, the existing neural network models using homomorphically encrypted messages only perform these operations during the inference process, and the use of the homomorphically encrypted messages, etc., has not been actively applied in the process of training the neural network models. That is, various training data are used in training the neural network models, but in order to create the neural network models simultaneously using the training data collected from multiple apparatuses, there was a problem such as the training data being exposed to other apparatuses.

SUMMARY

An object of the present disclosure is to provide a method for processing homomorphic encryption capable of training a neural network model without exposure to training data, and an electronic apparatus.

According to an aspect of the present disclosure, an electronic apparatus includes: a memory configured to store a training model trained using a plurality of training data; a communication device configured to perform communication with an external device; and a processor, in which the processor is configured to control the communication device to extract a feature of the training model, and homomorphically encrypt the extracted feature and transmit the homomorphically encrypted feature to a server apparatus, control the communication device to homomorphically encrypt the plurality of training data and transmit the homomorphically encrypted training data to the server apparatus, and when a homomorphically encrypted calculation result is received from the server apparatus, control the communication device to decrypt the received calculation result and transmit information on a training state corresponding to the decrypted value to the server apparatus.

The calculation result may be logit information calculated based on weight information updated by the training data, the processor may be configured to control the communication device to calculate a validation loss based on a decrypted logit result, and transmit training control information corresponding to the validation loss to the server apparatus.

The processor may be configured to control the communication device to store the calculated validation loss in the memory, determine to stop training when the validation loss does not decrease for the fixed number of epochs, determine to continue training when the validation loss decreases for the fixed number of epochs, and transmit the training control information corresponding to stopping the training or continuing the training to the server apparatus.

When encrypted weight information corresponding to the training model is received from the server apparatus, the processor may be configured to decrypt the received weight information to acquire a tuning layer for the training model and generate a second training model using the acquired tuning layer information and the training model.

According to another aspect of the present disclosure, a server apparatus includes: a memory; a communication device configured to perform communication with an electronic apparatus; and a processor, in which the processor is configured to receive, from the electronic apparatus, a feature-encrypted message in which a feature of a training model is homomorphically encrypted and homomorphically encrypted training data to be used for training the training model, update weight information corresponding to the training model using the homomorphically encrypted training data, calculate logit information corresponding to the updated weight information, control the communication device to transmit the calculated logit information to the electronic apparatus, and determine to stop the training or continue the training based on training control information when the training control information is received from the electronic apparatus.

The processor may control the communication device to transmit the updated weight information to the electronic apparatus when the training control information corresponding to stopping the training is received.

The processor may be configured to calculate the logit information using a matrix multiplication calculation for the feature-encrypted message and the updated weight information.

The processor may be configured to update the weight information using an activation calculation that uses a matrix multiplication calculation for two homomorphically encrypted messages during updating the weight information.

The processor may be configured to generate first matrix data having a row of a preset size and a column of a preset size using one of the two homomorphically encrypted messages, generate second matrix data having the row of the preset size and a column with a size of 1/n of the preset row using the other one of the two homomorphically encrypted messages, sequentially arrange a plurality of columns of the second matrix data n times in a preset column order to generate a plurality of third matrix data having the row of the preset size and the column of the preset size, generate a plurality of fourth matrix data in which a homomorphic multiplication calculation between the same row and the same column is performed using each of the plurality of generated third matrix data and the first matrix data, generate a plurality of fifth matrix data, in which each of a plurality of row values in the column has data obtained by homomorphically adding a plurality of row values of the corresponding column, in units of columns of each of the plurality of fourth matrix data, and generate a matrix multiplication calculation result for the first matrix and the second matrix by applying a preset mask to each of the plurality of generated fifth matrix data.

According to another aspect of the present disclosure, a method for processing a homomorphically encrypted message in an electronic apparatus includes: extracting a feature of a pre-trained training model and homomorphically encrypting the extracted feature and training data, respectively; transmitting the homomorphically encrypted feature and training data to a server apparatus; receiving a homomorphically encrypted calculation result from the server apparatus; decrypting the received calculation result; and transmitting information on a training state corresponding to the decrypted value to the server apparatus.

The calculation result may be logit information calculated based on weight information updated by the training data, and in the transmitting of the information on the training state, a validation loss may be calculated based on the decrypted logit result, and training control information corresponding to the validation loss may be transmitted to the server apparatus.

In the transmitting of the information on the training state, the calculated validation loss may be stored, stopping training may be determined when the validation loss does not decrease for the fixed number of epochs, continuing the training may be determined when the validation loss decreases for the fixed number of epochs, and the training control information corresponding to stopping the training or continuing the training may be transmitted to the server apparatus.

The method may further include: receiving encrypted weight information corresponding to the training model from the server apparatus; decrypting the received weight information to acquire a tuning layer for the training model; and generating a second training model using the acquired tuning layer information and the training model.

According to another aspect of the present disclosure, a method for processing a homomorphically encrypted message in a server apparatus includes: receiving, from an electronic apparatus, a feature-encrypted message in which a feature of a training model is homomorphically encrypted and homomorphically encrypted training data to be used for training the training model; updating weight information corresponding to the training data by performing a preset homomorphic calculation on the feature-encrypted message using the received training data; calculating logit information corresponding to the updated weight information; transmitting the calculated logit information to the electronic apparatus; receiving training control information from the electronic apparatus; and determining whether to stop training or continue the training based on the training control information.

The method may further include transmitting the updated weight information to the electronic apparatus when the training control information corresponding to stopping the training is received.

In the calculating of the logit information, the logit information may be calculated using a matrix multiplication calculation for the feature-encrypted message and the updated weight information.

In the updating step, the weight information may be updated using an activation calculation that uses a matrix multiplication calculation for two homomorphically encrypted messages.

The matrix multiplication calculation may generate first matrix data having a row of a preset size and a column of a preset size using one of the two homomorphically encrypted messages, second matrix data having the row of the preset size and a column with a size of 1/n of the preset row may be generated using the other one of the two homomorphically encrypted messages, a plurality of columns of the second matrix data may be sequentially arranged n times in a preset column order to generate a plurality of third matrix data having the row of the preset size and the column of the preset size, a plurality of fourth matrix data, in which a homomorphic multiplication calculation between the same row and the same column is performed, may be generated using each of the plurality of generated third matrix data and the first matrix data, a plurality of fifth matrix data, in which each of a plurality of row values in the column has data obtained by homomorphically adding a plurality of row values of the corresponding column, may be generated in units of columns of each of the plurality of fourth matrix data, and a matrix multiplication calculation result for the first matrix and the second matrix may be generated by applying a preset mask to each of the plurality of generated fifth matrix data.

According to another aspect of the present disclosure, a system includes: an electronic apparatus configured to store a plurality of training data and a training model; and a server apparatus configured to receive a first homomorphically encrypted message corresponding to the plurality of training data and a second homomorphically encrypted message corresponding to a feature of the training model, and generate weight information for updating the training model and provide the generated weight information to the electronic apparatus, in which the electronic apparatus decrypts the weight information received from the server apparatus, acquires a tuning layer for the training model, and updates the training model using the acquired tuning layer.

The server apparatus may update the weight information using the first homomorphically encrypted message and calculate the logit information based on the updated weight information, and the electronic apparatus may calculate a validation loss corresponding to the logit information and provide training control information corresponding to the validation loss to the server apparatus.

According to the method for processing an encrypted message according to the present disclosure, by performing the training using the homomorphically encrypted training data, it is possible to protect the training data, and by controlling the training operation on the server by continuously confirming a loss state on a client side during the training process, it is possible for the server to perform the training operation on the homomorphically encrypted data.

In addition, by using the matrix multiplication optimized for the homomorphically encrypted message, it is possible to perform the calculation speed in the above-described learning process more quickly.

BRIEF DESCRIPTION OF THE DRAWINGS

The above and/or other aspects of the disclosure will be more apparent by describing certain embodiments of the disclosure with reference to the accompanying drawings, in which:

FIG. 7 is a diagram for describing the $\text{DiagAB}^T$ calculation according to the embodiment of the present disclosure;

FIG. 8 is a diagram for describing a RotLeft calculation according to an embodiment of the present disclosure;

FIG. 9 is a diagram for describing a PRotUp calculation according to an embodiment of the present disclosure;

FIG. 10 is a diagram for describing a $\text{DiagA}^T\text{B}$ calculation according to an embodiment of the present disclosure;

DETAILED DESCRIPTION

Figure 1:
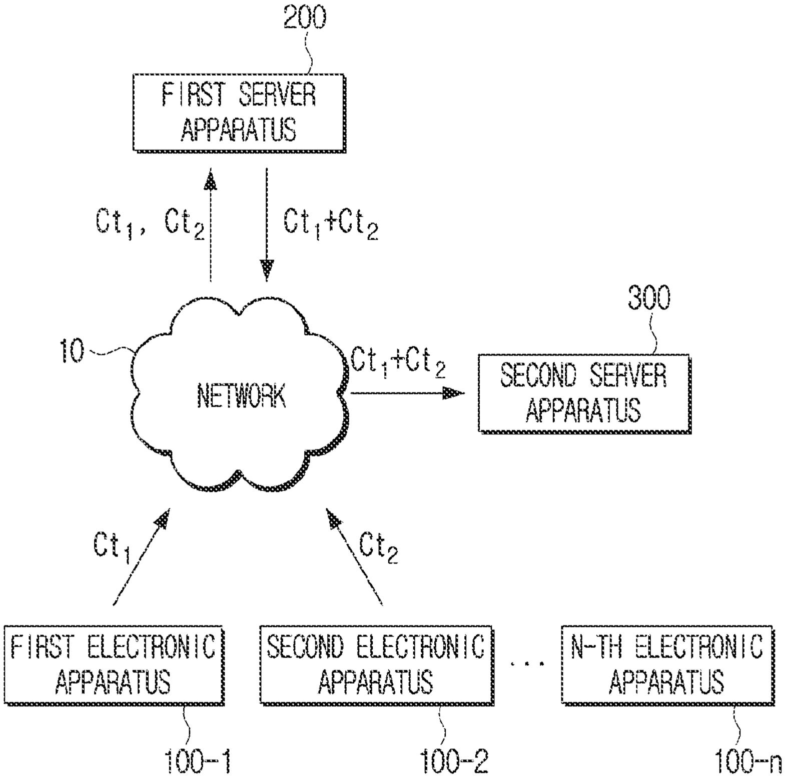
FIG. 1 is a diagram for describing a structure of a network system according to an embodiment of the present disclosure.

Hereinafter, the present disclosure will be described in detail with reference to the accompanying drawings. Encryption/decryption may be applied to an information (data) transmission process performed in the present disclosure, if necessary, and all expressions describing the information (data) transmission process in the present disclosure and claims should be interpreted as including cases of encryption/decryption even if not separately stated. In the present disclosure, expressions such as “transmission (delivery) from A to B” or “A receiving from B” include transmission (delivery) or reception with another medium included therebetween, and does not necessarily express only what is directly transmitted (delivered) or received from A to B.

In the description of the present disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In this specification, “A or B” is defined to mean not only selectively indicating either one of A and B, but also including both A and B. In addition, in the present disclosure, the term “include” has a meaning encompassing further including other components in addition to elements listed as included.

In this disclosure, only essential components necessary for the description of the present disclosure are described, and components unrelated to the essence of the present disclosure are not mentioned. In addition, it should not be interpreted as an exclusive meaning that includes only the mentioned components, but should be interpreted as a non-exclusive meaning that may include other components.

In addition, in the present disclosure, “value” is defined as a concept including a vector as well as a scalar value. In the present disclosure, the expressions such as “compute,” and “calculate” may be replaced by an expression that produces a result of the corresponding computation or calculation. In addition, unless otherwise stated, calculation on an encrypted message to be described below means a homomorphic calculation. For example, an addition of a homomorphically encrypted message means a homomorphic addition of two homomorphically encrypted messages.

Mathematical operations and calculations of each step of the present disclosure to be described below may be implemented as computer calculations by the known coding method and/or coding designed to suit the present disclosure in order to perform the corresponding operations or calculations.

Specific equations to be described below are illustratively described among possible alternatives, and the scope of the present disclosure should not be construed as being limited to equations mentioned in the present disclosure.

For convenience of description, in the present disclosure, a notation is defined as follows.

$a \rightarrow D$: select element a according to distribution D $s_1, s_2 \in R$: Each of $s_1$ and $s_2$ is an element belonging to set R.

mod(q): Modular calculation with element q $\lfloor \cdot \rceil$: Round-off internal value Hereinafter, various embodiments of the present disclosure will be described in detail with reference to the accompanying drawings.

FIG. 1 is a diagram for describing a structure of a network system according to an embodiment of the present disclosure.

Referring to FIG. 1, a network system may include a plurality of electronic apparatuses 100-1 to **100-*n*, a first server apparatus 200, and a second server apparatus 200, each of which may be connected to each other through a network 10**.

The network 10 may be implemented in various types of wired and wireless communication networks, broadcasting communication networks, optical communication networks, cloud networks, etc., and each apparatus may also be connected through methods such as Wi-Fi, Bluetooth, near field communication (NFC), etc., without a separate medium.

Although FIG. 1 illustrates a plurality of electronic apparatuses, the plurality of electronic apparatuses are not necessarily used, and one apparatus may be used. For example, the electronic apparatuses 100-1 to 100-*n* may be implemented as various types of apparatuses such as smart phones, tablets, game players, PCs, laptop PCs, home servers, and kiosks. In addition, the electronic apparatuses 100-1 to 100-*n* may be implemented in the form of home appliances to which an IoT function is applied.

Users may input various types of information through the electronic apparatuses 100-1 to 100-*n* they use. The input information may be stored in the electronic apparatuses 100-1 to 100-*n* themselves, but may also be transmitted to and stored in an external device for storage capacity and security reasons. In FIG. 1, the first server apparatus 200 may serve to store such information, and the second server 300 may serve to use some or all of the information stored in the first server apparatus 200.

Each electronic apparatus 100-1 to 100-*n* may homomorphically encrypt the input information and transmit a homomorphically encrypted message to the first server apparatus 200.

Each of the electronic apparatuses 100-1 to 100-*n* may include encryption noise, i.e., an error, calculated during performing homomorphic encryption in an encrypted message. Specifically, the homomorphically encrypted message generated by each of the electronic apparatuses 100-1 to 100-*n* may be generated in a form in which a result value including a message and an error value is restored when decrypted later using a secret key.

For example, when the homomorphically encrypted messages generated by the electronic apparatuses 100-1 to 100-*n* are decrypted using a secret key, the homomorphically encrypted messages may be generated in a form that satisfies the following natures.

$$Dec(ct, sk) = \langle ct, sk \rangle = M + e(\mathrm{mod}\, q) \quad \text{[Equation 1]}$$

Here, <, > denotes a dot product calculation (usual inner product), ct denotes an encrypted message, sk denotes a secret key, M denotes a plain text message, e denotes an encryption error value, and mod q denotes a modulus of an encrypted message. q should be selected to be greater than a result value M obtained by multiplying a scaling factor Δ by a message. When an absolute value of the error value e is sufficiently small compared to M, a decryption value M+e of the encrypted message is a value that may replace the original message with the same precision in significant figure calculation. Among the decrypted data, an error may be arranged on the least significant bit (LSB) side, and M may be arranged on the next least significant bit side.

When a size of the message is too small or too large, the size may be adjusted using a scaling factor. When the scaling factor is used, not only an integer type message but also a real number type message may be encrypted, and thus, the usability of the message may be greatly increased. In addition, by adjusting the size of the message using the scaling factor, a size of an area where messages exist in the encrypted message after the calculation is made, that is, a size of an effective area may also be adjusted.

Depending on the embodiment, a modulus q of the encrypted message may be set and used in various forms. For example, the modulus of the encrypted message may be set in the form of an exponential power $q=\Delta^L$ of the scaling factor Δ. When Δ is 2, Δ may be set to a value such as $q=2^{10}$.

In addition, the homomorphically encrypted message according to the present disclosure is described on the assumption that a fixed point is used, but may be applied even when a floating point is used.

Meanwhile, the homomorphically encrypted message generated by the electronic apparatus 100 according to the present disclosure may be an LWE type encrypted message. Specifically, this is to save communication resources during transmitting the generated encrypted message. When implementing, the MLWE or RLWE scheme, rather than the LWE scheme, may be used. In addition, in the present disclosure, the generated homomorphically encrypted message may not be the general LWE or RLWE scheme, but may be a method for generating only some components (information) constituting the corresponding encrypted message.

The first server apparatus 200 may store the received homomorphically encrypted message in an encrypted message state without decrypting received homomorphic encrypted message. Meanwhile, the first server apparatus 200 may store not only the homomorphically encrypted message encrypted by one scheme, but also the homomorphically encrypted message encrypted by various schemes.

In this case, the first server apparatus 200 may perform a conversion operation on the homomorphically encrypted message encrypted by different schemes, or may perform a process of merging a plurality of homomorphically encrypted messages into one encrypted message.

The second server apparatus 200 may request a specific processing result for the homomorphically encrypted message from the first server apparatus 200. The first server apparatus 200 may perform specific calculation according to the request of the second server apparatus 200 and then transmit the result to the second server apparatus 200.

For example, when encrypted messages ct1 and ct2 transmitted by the two electronic apparatuses 100-1 and 100-2 are stored in the first server apparatus 200, the second server apparatus 200 may request, from the first server apparatus 200, a value obtained by summing information provided from the two electronic apparatuses 100-1 and 100-2. The first server apparatus 200 may perform calculation for summing the two encrypted messages according to the request, and then transmit the result value ct1+ct2 to the second server apparatus 200.

Due to the nature of the homomorphically encrypted message, the first server apparatus 200 may perform the calculation without the decryption, and the result value is also in the form of the encrypted message. In the present disclosure, the result value obtained by calculation is referred to as a calculation result encrypted message.

The first server apparatus 200 may transmit the calculation result encrypted message to the second server apparatus 200. The second server apparatus 200 may decrypt the received calculation result encrypted message and acquire calculation result values of data included in each homomorphically encrypted message.

The first server apparatus 200 may perform the calculation several times according to a user request. In this case, proportions of approximate messages within the calculation result encrypted messages obtained for each calculation are different. The first server apparatus 200 may perform a bootstrapping operation when the proportions of the approximate messages exceed a threshold value. In this way, the first server apparatus 200 may be referred to as a calculation device in that it may perform a calculation operation.

Specifically, when q is less than M in Equation 1 described above, since M+e (mod q) has a different value from M+e, the decryption becomes impossible. Therefore, the q value should always be kept greater than M. However, as the calculation progresses, the q value gradually decreases. Therefore, an operation of changing the q value so that the q value is always greater than M is required, and this operation is called the bootstrapping operation. As the bootstrapping operation is performed, the encrypted message may become calculable again.

Meanwhile, FIG. 1 illustrates a case where the first electronic apparatus and the second electronic apparatus perform the encryption and the second server performs the decryption, but is not necessarily limited thereto.

Meanwhile, the electronic apparatus and server apparatus of FIG. 1 may be used for transfer learning (TL). Specifically, the operation of the TL according to the present disclosure will be described below with reference to FIG. 2.

Figure 2:
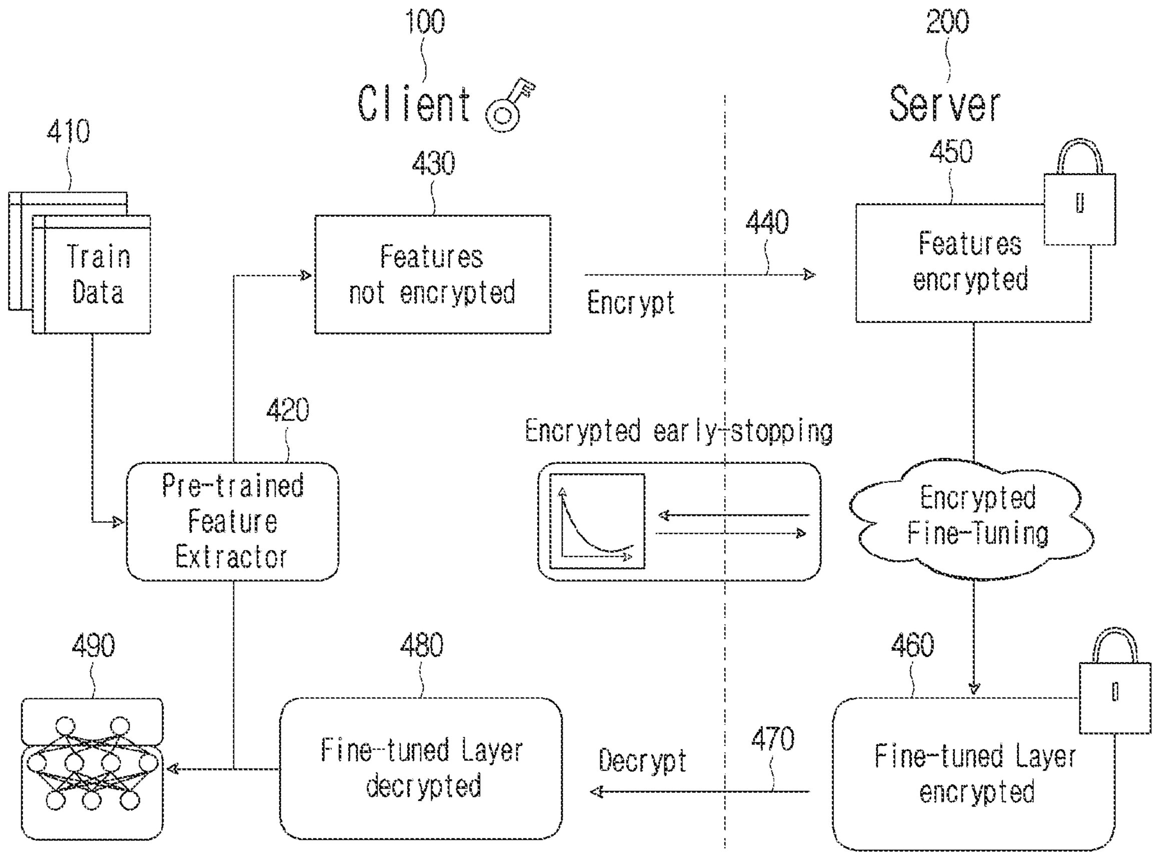
FIG. 2 is a diagram for describing an operation of transfer learning (TL) according to an embodiment of the present disclosure.

FIG. 2 is a diagram for describing an operation of TL according to an embodiment of the present disclosure.

The TL is a technique that is used as the basis for a model that performs a similar task using a model trained for one task. When using the TL, a model to be used in a new environment is generated with only an additional update operation, which is faster and easier than training a neural network from scratch. For example, information trained to recognize cars may be applied when attempting to recognize trucks.

In the following, for ease of description, it is assumed that the TL is applied to a multi-class classification task, but it may be applied to various fields other than those described above.

Meanwhile, the existing method for using a training model by homomorphically encrypting data for reasons such as personal information has been proposed. However, the existing scheme is only applied from the perspective of using the trained results, that is, in the inference process of the training model, and is not applied in the process of generating a new training model in the TL process as described above.

Specifically, the TL as described above requires a process of retraining the existing training model using new training data. When this operation is performed on one device, there will be no problems with disclosure of training data.

However, when the above-described TL process, etc., is performed on a separate external device, that is, when the operation for the TL is to be performed on a server with excellent resources, etc., conventionally, it is difficult to protect personal information, etc., in that training data, etc., to be used for re-training should provided to the server as it is.

In other words, the present disclosure describes method for performing the above-described TL on an external device without information such as training data being exposed to the outside.

Specifically, in the process of enabling another device (e.g., server) to perform TL on a training model stored by a client, the training data is not provided to the server in a plain text, but is provided in a homomorphically encrypted state.

To improve the existing model, a general TL approach to fine-tune the existing model and the training of the corresponding layer uses a Nesterov's accelerated gradient. However, during the implementation, other fine-tuning layers and other training schemes in addition to the schemes described above may be used.

Meanwhile, the training of the above-described layers uses a scheme of minimizing a cross-entropy loss LCE. Hereinafter, N denotes a mini-batch size, f denotes the number of features, and c denotes the number of classes.

The number of features f is equal to an output dimension of the pre-trained feature extractor.

Accordingly, $X=(x_{ij})\in R^{N\times(f+1)}$ and $Y=(y_{ik})\in R^{N\times c}$ may be expressed as matrice representing each of the input features and a one-hot encoding level of data in the mini-batch. $W=(w_{kj})\in R^{c\times(f+1)}$ is expressed as a parameter matrix.

Assume that the last column of W is a bias column, and each column of X is filled with one value. The probability that i-th data belongs to a k-th class may be modeled using an activation function (or a softmax function) as follows.

$$prob(X;W)_{ik} = Softmax\left(X_i W^T\right)_k \quad \text{[Equation 2]}$$

Here, $X_i\in R^{f+1}$ is satisfied and Xi is an i-th row of X. Hereinafter, the above-described possibility is referred to as $P=(prob(X;\ W)_{ik})\in R^{N\times c}$. A gradient $\nabla_W L_{CE}$ of the cross entropy loss LCE of W may be expressed as follows.

$$\nabla_W L_{CE} = \frac{1}{N}(P-Y)^T X \quad \text{[Equation 3]}$$

Using this, the layer parameter W of Nesterov Accelerated Gradient (NAG) may be updated. For example, each step may be expressed as follows.

$$W_{t+1} = V_t - \alpha\nabla_{V_t} L_{CE} \quad \text{[Equation 4]}$$

$$V_{t+1} = (1-\gamma_t)W_{t+1} + \gamma_t W_t$$

Herein, $V_t$ denotes an auxiliary parameter with a randomized initial value $V_1=W_1$, α denotes a learning rate, and $$\gamma_t = (1-\lambda_t)/\lambda_{t+1}\left(\text{where } \lambda_0 = 0,\ \lambda_{t+1} = \left(1+\sqrt{1+4\lambda_t^2}\right)/2\right).$$

Hereinafter, referring to FIG. 2, the separate operations of the TL in the electronic apparatus and server apparatus will be described.

Referring to FIG. 2, the electronic apparatus 100 owns data, and the server apparatus 200 outsources an ML training operation. However, during this process, it may be said that the main operation of this application is to outsource the above-described training operation in the in which the training data included in the electronic apparatus may not be directly known.

First, the electronic apparatus 100 may perform homomorphic encryption $$B_{train}^{ct} = \{(X_{train}^{ct}, Y_{train}^{ct})\}$$

on training data 410. The electronic apparatus 100 may extract features using training model 490 (420) and perform homomorphic encryption $$X_{val}^{ct}$$

on the extracted features (440).

The electronic apparatus 100 may transmit the homomorphically encrypted message $$B_{train}^{ct} = \{(X_{train}^{ct}, Y_{train}^{ct})\}$$

for the training data and the homomorphically encrypted message $$X_{val}^{ct}$$

for the features of the training model to the server apparatus 200.

The server apparatus 200 may fine-tune the classification layer corresponding to the encrypted data using the NAG and output the encrypted fine-tuned layer (470). Specifically, the server apparatus 200 may update weight information corresponding to the training model using homomorphically encrypted training data.

More specifically, the server apparatus may use the NAG for each training data to update parameters (i.e., weight values) as illustrated in Equation 5 below. Equation 5 is an application of Equation 4 described above to the homomorphically encrypted message.

$$W_{t-1}^{ct} = V_t^{ct} - \frac{\alpha}{N}(P^{ct} - Y^{ct})^T X^{ct} \qquad \text{[Equation 5]}$$

$$V_{t+1}^{ct} = (1-\gamma_t)W_{t+1}^{ct} + \gamma_t W_t^{ct}$$

Here, α is the training rate, N is the batch size, and $P^{ct}$ is $$ASoftmax\left(X^{ct}(V_t^{ct})^T\right)$$

with(row_wise)softemax approximation.

When the weight Wet is updated by this training process, the server apparatus may calculate logit as illustrated in Equation 6 below and transmit the calculated logit information to the electronic apparatus 100.

$$l_{val}^{ct} = X_{val}^{ct}(W^{ct})^T \qquad \text{[Equation 6]}$$

When such logit information is provided to the electronic apparatus 100, the electronic apparatus 100 may decrypt the logit information and the decrypted logit information and a value $$y_{val}^{pt}$$

corresponding to the pre-stored training data to calculate the validation loss.

The electronic apparatus 100 may store the calculated validation loss, determine to stop training when the validation loss does not decrease for the fixed number of epochs, determine to continue training when the validation loss decreases for the fixed number of epochs, and transmit the training control information corresponding to stopping the training or continuing the training to the server apparatus 200.

Based on such training control information, the server apparatus 200 may selectively repeat the training operation or end the training operation in a current state. For example, when the training control information corresponding to the stop of the training is received, the server apparatus 200 may change a current weight $$W_*^{CT}$$

to a new weight. The server apparatus 200 may transmit the new weight to the electronic apparatus 100 (470).

The electronic apparatus 100 may decrypt the received weight (480), acquire the tuning layer using the corresponding weight, and reflect the corresponding tuning layer in the existing training model to create a new training model. Meanwhile, the above-described operation may also be expressed as updating the existing training model.

In performing the TL in this way, the TL may be performed without exposing the training data to the outside in that the electronic apparatus provides only the homomorphically encrypted data to the server apparatus and the server apparatus performs only the calculation without the decryption method for the corresponding data and provides the calculation result to the electronic apparatus.

Meanwhile, in the above-described process, multiple matrix multiplications are often used. For example, in the P calculation or logit calculation process, the matrix multiplication such as $AB^T$ is used. The matrix multiplication in the homomorphically encrypted message state may perform the homomorphic multiplication calculation more quickly using the matrix multiplication scheme described in FIGS. 5 and 6.

Figure 3:
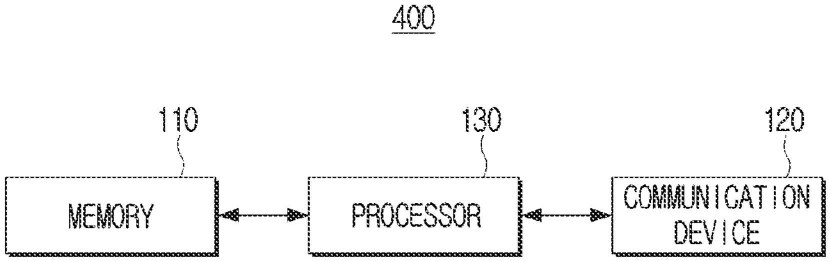
FIG. 3 is a block diagram for describing components of an electronic apparatus according to an embodiment of the present disclosure.

FIG. 3 is a block diagram for describing components of the electronic apparatus according to the exemplary embodiment of the present disclosure.

Referring to FIG. 3, the electronic apparatus 100 may include a memory 110, a communication interface 120, and a processor 130.

The memory 110 is a component for storing an O/S for driving the electronic apparatus 100 or various instructions and/or software, data, etc., related to the generation and calculation processing of the homomorphically encrypted message to be described later. The memory 110 may be implemented in various forms such as RAM, ROM, flash memory, HDD, external memory, and memory card, but is not limited to any one.

The memory 110 stores the message to be encrypted. Here, the message may be various types of credit information, personal information, and the like cited by a user, and may also be information related to location information used in the electronic apparatus 100 and a use history such as Internet usage time information.

The memory 110 may store the training model and the training data for the training model. In addition, the memory 110 may store extracted features for the above-described training model and the homomorphically encrypted message for the corresponding features, and may store the homomorphically encrypted message for the above-described training data.

Here, the training data may be composed of a plurality of data, where one input value and one result value may be composed of one homomorphically encrypted message, and a plurality of input values and a plurality of result values may be composed of one homomorphically encrypted message. That is, the homomorphically encrypted message may pack the plurality of encrypted messages, and by packing the plurality of corresponding sets, the plurality of training data sets may be stored in one homomorphically encrypted message.

In addition, the memory 110 may store a public key, and when the electronic apparatus 100 is an apparatus that directly generates the public key, the memory 110 may store not only a secret key, but also various parameters necessary for generating the public key and the secret key.

In addition, the memory 110 may store the homomorphically encrypted message (e.g., merged homomorphically encrypted message or homomorphically encrypted message that is a result of a homomorphic calculation) generated in a process to be described later. In this case, the encrypted message stored in the memory 110 may be an RLWE type encrypted message.

The communication device 120 is formed to connect the electronic apparatus 100 to an external device (not illustrated), and may be connected to the external device through a local area network (LAN) and the Internet network or be connected to the terminal apparatus through a USB port or a wireless communication (for example, wireless fidelity (WiFi), 802.11a/b/g/n, near field communication (NFC), or Bluetooth) port. Such a communication device 120 may also be referred to as a transceiver.

The communication device 120 may receive a public key from the external device and transmit the public key (or calculation key) generated by the electronic apparatus 100 to the external device.

Also, the communication device 120 may receive a message from the external device and transmit the generated homomorphically encrypted message to the external device. For example, it may be a first homomorphically encrypted message corresponding to the features of the training model and a second homomorphically encrypted message corresponding to the training data.

In addition, the communication device 120 may receive various parameters required for generating an encrypted message from an external device.

In addition, the communication device 120 may transmit and receive data required for the TL to and from the server apparatus 200. For example, the communication device 120 may transmit the above-described first homomorphically encrypted message and second homomorphically encrypted message to the server apparatus 200, and receive the homomorphically encrypted logit information, the homomorphically encrypted weight information, etc., from the server apparatus 200.

The processor 130 controls the respective components in the electronic apparatus 100. The processor 130 may be composed of a single device such as a central processing unit (CPU) and an application-specific integrated circuit (ASIC), or may be composed of a plurality of devices such as a CPU and a graphics processing unit (GPU).

When the message to be transmitted is input, the processor 130 stores the message in the memory 110. The processor 130 may use various setting values and programs stored in the memory 110 to homomorphically encrypt the message. In this case, the public key may be used.

The processor 130 may generate and use a public key required to perform encryption by itself, or may receive and use the public key from an external device. For example, the second server apparatus 200 that performs the decryption may distribute a public key to other devices.

When generating a key by itself, the processor 130 may generate a public key using a ring-LWE technique. Specifically, the processor 130 may first set various parameters and rings and store the parameters and rings in the memory 110. Examples of the parameters may include a length of bits of a plain text message, a dimension k, a rank k, a size of public and secret keys, and the like. There are various formats for the homomorphically encrypted message, and the processor 130 may set the ring according to the encrypted message type according to the scheme set by the user or the predetermined scheme. For example, the above-described homomorphically encrypted message type may be a CKKS scheme, a RLWE scheme, etc.

The ring may be expressed as Equation 7 below:

$$R = Z_q[X]/f(x) \qquad \text{[Equation 7]}$$

Here, R denotes a ring, Zq denotes a coefficient, and f(x) denotes an n-th polynomial.

The ring is a set of polynomials having predetermined coefficients, and means a set in which addition and multiplication are defined between elements and which is closed for addition and multiplication. Such a ring may be referred to as an annulus.

For example, the ring means a set of n-th polynomials having a coefficient Zq. Specifically, when n is Φ(N), it refers to polynomials that may be calculated as the remainder of dividing the polynomial by an N-th cyclotomic polynomial. f(x) denotes ideal of Zq[x] generated by the f(x). The Euler totient function Φ(N) means the number of natural numbers that is coprime to N and smaller than N.

The ring used in the above-described MLWE may be expressed as Equation 8 below:

$$R_{q,N} = Z_q[X_{(N)}]/(X_{(N)}^N + 1) \qquad \text{[Equation 8]}$$

Here, q denotes a modulus, k denotes a rank, and N denotes a dimension. Meanwhile, the above-described ring assumes the MLWE, so when using LWE, N may be replaced with 1 and used, and in the RLWE scheme, k may be replaced with 1 and used.

When such a ring is set, the processor 130 may calculate the secret key sk from the ring.

$$sk \leftarrow (1, s(x)), s(x) \in R \qquad \text{[Equation 9]}$$

Here, s(x) means a polynomial generated randomly with small coefficients.

When the ring and secret key are selected, the processor 130 calculates a first random polynomial a(x) from the ring. The first random polynomial may be expressed as follows.

$$a(x) \leftarrow R \qquad \text{[Equation 10]}$$

In addition, the processor 130 may calculate an error. Specifically, the processor 130 may extract an error from a discrete Gaussian distribution or a distribution statistically close to the discrete Gaussian distribution. This error may be expressed as follows.

$$e(x) \leftarrow D^n_{\alpha q} \qquad \text{[Equation 11]}$$

When the error is calculated, the processor 250 may calculate a second random polynomial by performing modular calculation on the error in the first random polynomial and the secret key. The second random polynomial may be expressed as follows.

$$b(x) = -a(x)s(x) + e(x)(\text{mod } q) \qquad \text{[Equation 12]}$$

Finally, a public key pk is set as follows in a form including the first random polynomial and the second random polynomial.

$$pk = (b(x), a(x)) \qquad \text{[Equation 13]}$$

Meanwhile, the contents of Equations 9 to 13 described above are examples of using the ckks scheme method (i.e., RLWE scheme), but when using the LWE or MLWE scheme, the above-described method may be modified and used to suit the corresponding scheme. In addition, of course, the public key and secret key may be generated using other methods other than the method described above.

The processor 130 may generate a homomorphically encrypted message for a message. Specifically, the processor 130 may generate a homomorphically encrypted message by applying the previously generated public key to the message. For example, in the process of performing the TL, the processor 130 may homomorphically encrypt each of the features of the training model and the training data to generate the first homomorphically encrypted message for the features of the training model and the second homomorphically encrypted message for the training data.

When the homomorphically encrypted message is generated, the processor 130 may control the communication device 120 to store the homomorphically encrypted message in the memory 110 or transmit the homomorphic encrypted message to another device according to a user request or a predetermined default command.

The processor 130 may perform the homomorphic calculation. This homomorphic calculation may be the calculation related to the TL described above. In addition, in the above-described TL process, a matrix multiplication calculation in the state of the homomorphically encrypted message may be used. In this case, the matrix multiplication calculation may be performed through the operations of FIGS. 5 and 6, which will be described later.

Meanwhile, when the homomorphic calculation is completed, the processor 130 may detect data in an effective area from the calculation result data. Specifically, the processor 130 may detect the data in the effective area by performing rounding processing on the calculation result data. The rounding processing means rounding-off a message in an encrypted state, and may also be referred to as rescaling.

Specifically, the processor 130 removes a noise area by multiplying each component of the encrypted message by $\Delta^{-1}$ which is the reciprocal of the scaling factor, and rounding-off each component of the encrypted message. The noise area may be determined to correspond to the size of the scaling factor. As a result, it is possible to detect a message in the effective area from which the noise area is excluded. Since it proceeds in the encrypted state, an additional error occurs, but the size is small enough to be ignored.

Further, when the homomorphically encrypted message needs to be decrypted, the processor 130 may apply a secret key to the homomorphically encrypted message to generate a polynomial-type decrypted message, and decode the polynomial-type decrypted message to generate a message. In this case, the generated message may include an error as mentioned in Equation 1 described above.

For example, in the TL process, when the logit information is received, the processor 130 may perform a process of decrypting the received logit information. In addition, when the homomorphically encrypted weight information is received, the processor 130 may perform decryption on the received weight information.

The processor 130 may control the communication device 220 to calculate a validation loss based on the previously calculated decrypted logit information and transmit the training control information corresponding to the validation loss to the server apparatus. For example, the processor 130 may store the calculated validation loss in the memory 110, determine to stop the training when the validation loss does not decrease for the fixed number of epochs, and determine to continue the training when the validation loss decreases for the fixed number of epochs.

The processor 130 may control the communication device 120 to transmit the training control information corresponding to stopping the training or continuing the training to the server apparatus.

When the encrypted weight information corresponding to the training model is received from the server apparatus, the processor 130 is configured to decrypt the received weight information to acquire the tuning layer for the training model and generate a second training model using the acquired tuning layer information and the training model.

Meanwhile, only simple components constituting the electronic apparatus 100 have been illustrated and described hereinabove, but various components may be further included in the electronic apparatus 100 in at the time of implementing the electronic apparatus 100.

Figure 4:
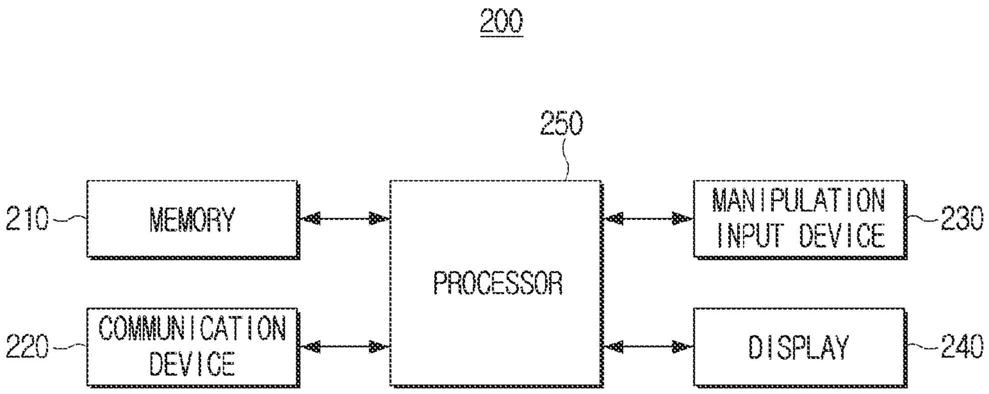
FIG. 4 is a block diagram illustrating a configuration of a server apparatus according to an embodiment of the present disclosure.

FIG. 4 is a block diagram illustrating a configuration of a server apparatus according to an embodiment of the present disclosure.

Referring to FIG. 4, the server apparatus 200 may include a memory 210, a communication device, a manipulation input device 230, a display 240, and a processor 250.

The memory 210 is a component for storing an O/S for driving the server apparatus 200 or various instructions and/or software, data, etc., related to the generation and calculation processing of the homomorphically encrypted message to be described later. The memory 210 may be implemented in various forms such as RAM, ROM, flash memory, HDD, external memory, and memory card, but is not limited to any one.

The memory 210 may store the received homomorphically encrypted message. Here, the homomorphically encrypted message may be the first homomorphically encrypted message corresponding to the features of the training model or the second homomorphically encrypted message for the training data.

In addition, the memory 210 may store the homomorphically encrypted message (e.g., weight information, logit information, etc.) generated in the process to be described later. In this case, the encrypted message stored in the memory 210 may be the RLWE type encrypted message.

The communication device 220 is formed to connect the server apparatus 200 to an external device (not illustrated), and may be connected to the external device through a local area network (LAN) and the Internet network or be connected to the external device through a USB port or a wireless communication (for example, wireless fidelity (WiFi), 802.11a/b/g/n, near field communication (NFC), or Bluetooth) port. Such a communication device 220 may also be referred to as a transceiver.

The communication device 220 may transmit and receive various data used in the TL, etc., to and from the electronic apparatus 100. For example, the communication device 220 may receive the above-described first homomorphically encrypted message and second homomorphically encrypted message from the server apparatus 200, and transmit the homomorphically encrypted logit information, the homomorphically encrypted weight information, etc., from the electronic apparatus 100.

The manipulation input device 230 may receive a function selection of the server apparatus 200 and a control command for the function from the user. The manipulation input device 230 may receive a transmission command for a homomorphically encrypted message, a homomorphic calculation command, etc.

The display 240 displays a user interface window for selecting a function supported by the server apparatus 200. Specifically, the display 240 may display a user interface window for selecting various functions provided by the server apparatus 200. This display 240 may be a monitor such as LCD, CRT, OLED, etc., and may also be implemented as a touch screen that may simultaneously perform the functions of the manipulation input device 230 described above.

The processor 250 controls the respective components in the electronic apparatus 100. The processor 250 may be composed of a single device such as a central processing unit (CPU) and an application-specific integrated circuit (ASIC), or may be composed of a plurality of devices such as a CPU and a graphics processing unit (GPU).

The processor 250 may perform the TL operation. Specifically, when the processor 250 receives a feature-encrypted message in which the features of the training model are homomorphically encrypted and the homomorphically encrypted training data to be used for training the training model from the electronic apparatus 100, the processor 250 may store the feature-encrypted message and homomorphically encrypted training data in the memory 210.

The processor 250 may update weight information corresponding to the training model using homomorphically encrypted training data. Specifically, the processor 250 may update the weight information using Equation 5 described above. In this case, the processor 250 may update weight information using an activation (or a softmax) calculation that uses a matrix multiplication calculation for two homomorphically encrypted messages. Meanwhile, such weight information is generated and updated with homomorphically encrypted data and is in the homomorphically encrypted state.

The processor 250 calculates the logit information corresponding to the updated weight information. Specifically, the processor 250 may calculate the logit information using Equation 6. In this case, the processor 250 may calculate the logit information using the matrix multiplication calculation for the feature-encrypted message and the updated weight information.

Figure 5:
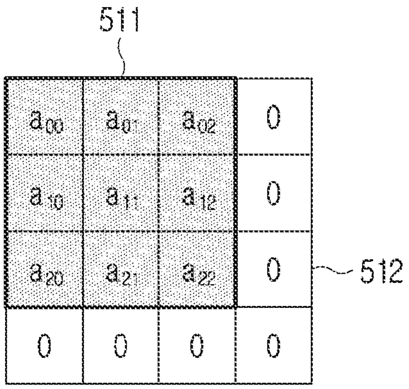
FIG. 5 is a diagram for describing a single block used in an embodiment of the present disclosure.
Figure 6:
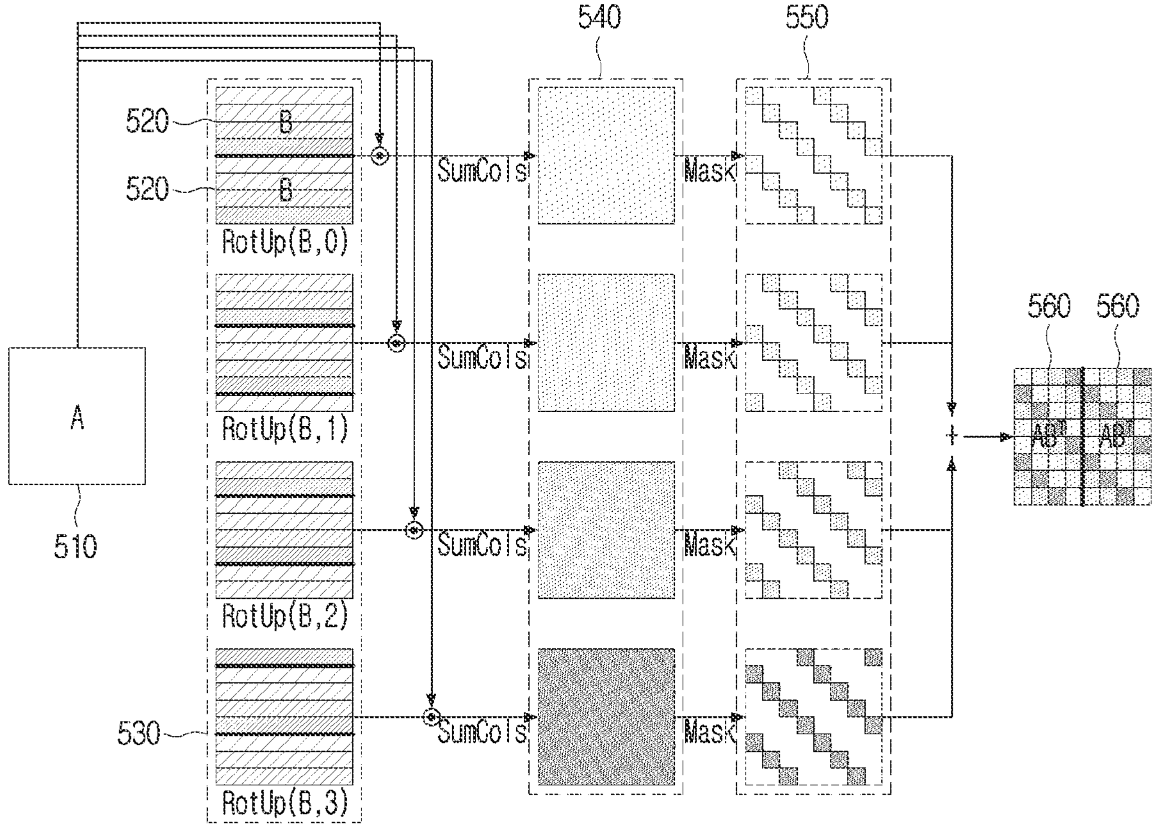
FIG. 6 is a diagram for describing a $\text{DiagAB}^T$ calculation according to an embodiment of the present disclosure.

Here, the specific operation of the matrix multiplication calculation is described in detail in FIGS. 5 and 6.

In addition, the processor 250 may control the communication device 220 to transmit the calculated logit information to the electronic apparatus.

When the training control information is received from the electronic apparatus 100, the processor 250 may determine whether to stop the training or continue the training based on the training control information. For example, when the training control information corresponding to the determination to continue the training is received, the above-described training process may be performed repeatedly.

Conversely, when the training control information corresponding to stopping the training is received, the processor 250 may control the communication device 220 to transmit the updated weight information to the electronic apparatus 100.

Meanwhile, although only the operations related to the TL are described above, the processor 250 may also perform the key generation operation, the homomorphic encryption operation, and the decryption operation described in FIG. 2.

Meanwhile, only simple components constituting the server apparatus have been illustrated and described hereinabove, but various components may be further included at the time of implementing the server apparatus 200. In addition, some of the illustrated components (e.g., manipulation input device, display) may be omitted.

FIG. 5 is a diagram for describing a single block used in an embodiment of the present disclosure.

Referring to FIG. 5, when matrix A 511 is composed of a single block and $a \le s_0$ and $b \le s_1$, the processor 250 may apply zero padding to a right end and bottom of the matrix A 511 in a unit matrix 512, and encode the matrix A 511 into a single block using a row-major method. Here, a denotes a size of a row for the matrix A 511, and b denotes a size of a column for the matrix A 511.

For example, as illustrated in FIG. 5, when the matrix A 511 is a 3×3 matrix (a=b=3) and the unit matrix 512 is a 4×4 matrix (a=b=4), in the unit matrix 512, it can be seen that the matrix A 511 is filled and the zero padding is applied to a fourth column on the right end and a fourth row at the bottom of the remaining matrix.

An encoding matrix <A>, in which the matrix A 511 ($A=(a_{ij})_{0 \le ij < 3}$) to which the zero padding is applied, is encoded by the row-major method may be expressed as follows.

$$< A >= (a_{00}, a_{01}, a_{02}, 0, a_{10}, a_{11}, a_{12}, 0, a_{20}, a_{21}, a_{22}, 0, 0, 0, 0, 0) \quad \text{[Equation 14]}$$

FIG. 6 is a diagram for describing a Diag$AB^T$ calculation according to an embodiment of the present disclosure. FIG. 7 is a diagram for describing the Diag$AB^T$ calculation according to the embodiment of the present disclosure. Specifically, FIG. 6 is a diagram illustrating a process of performing $AB^T$ matrix multiplication according to one or more embodiments of the present disclosure, and FIG. 7 illustrates an algorithm of performing $AB^T$ matrix multiplication according to one or more embodiments of the present disclosure.

Referring to FIGS. 6 and 7, basic homomorphic encryption (HE) calculations such as addition, multiplication, and rotation may be used for the matrix multiplication of the homomorphic encryption for two encrypted matrices $A \in R^{a \times b}$ and $B \in R^{c \times b}$ to calculate $AB^T \in R^{a \times c}$.

Here, a denotes a row of a preset size, b denotes a column of a preset size, and c denotes a size of row for matrix B.

The processor 250 may perform encoding on the matrix A and generate first matrix data 510 having a row A of a preset size and a column b of a preset size. The processor 250 may perform encoding on the matrix B, and generate the second matrix data 520 that has a row c with a size of 1/n of the preset column b and a column b with a preset size. Here, n may be a natural number. In this disclosure, for convenience of description, the description is made based on the case where n is 2.

For example, referring to FIG. 6, the encrypted matrix A may be encoded to generate the encoding matrix A 510 having a 8×8 matrix size, and the matrix B may be encoded to generate the encoding matrix B 520 with a 4×8 matrix size.

The processor 250 may sequentially arrange a plurality of rows of the second matrix data 520 twice in a preset row order to generate a plurality of third matrix data 530 having a row with a size of a preset column and a column of a preset size.

In FIG. 5, it can be seen that the encoding matrix B 520 has half the size of the column of the encoding matrix A 510 so that the size of the row for the matrix multiplication corresponds to the column of the encoding matrix A 510, and is sequentially arranged twice in the preset row order. That is, the encoding matrix B 520 is arranged two in an up-down direction and has the row of the same size as the column of the encoding matrix A 510. However, when n is 3, that is, when the row of the encoding matrix B has a size of ⅓ of the column of the matrix A, the encoding matrix B may be arranged three in the up-down direction to generate the plurality of third matrix data so that the plurality of third matrix data have the row of the same size as the column of the encoding matrix A.

The processor 250 may perform a RotUp(B, k) calculation on the encoding matrix B 520 to sequentially arrange the encoding matrix B 520 in the preset row order as illustrated in FIGS. 6 and 7. The RotUp(B, k) denotes a row circulation calculation that sequentially circulates each row upward by k in the encoding matrix B 520. Third matrix data B' 530 acquired through the RotUp(B, k) calculation result may be expressed as Equation 15 below.

$$B'_{i,j} = B_{(i+k) mod\, c,j} \quad \text{[Equation 15]}$$

In this case, assuming that the encoding matrix B 520 is encoded in the row direction, the RotUp(B, k) may be obtained by applying left rotation to the encoding matrix B 520 by index kb, and may be expressed as Equation 16 below.

$$RotUp(B, k) = Lrot(B, kb) \quad \text{[Equation 16]}$$

Next, the processor 250 may generate a plurality of fourth matrix data on which the homomorphic multiplication calculation between the same row and the same column is performed using each of the first matrix data 510 and the plurality of generated third matrix data 530. That is, the processor 250 performs the matrix multiplication on each of the encoding matrix A 510 and the third matrix data Bk 530 calculated through RotUp(B, k).

The processor 250 generates a plurality of fifth matrix data 540, in which each of the plurality of column values in a row has data obtained by homomorphically adding the plurality of column values of the corresponding row, in units of rows of each of the plurality of fourth matrix data. That is, when the matrix multiplication result of the encoding matrix A 510 and the third matrix data Bk 530 is matrix X which is a $s_0 \times s_1$ matrix, the processor 250 performs a SumCols(X) calculation on the matrix X.

The SumCols(X) denotes the sum of columns in each row in the matrix X, and may be expressed as Equation 17 below. The SumCols(X) may also be calculated as 2 log $s_1$ rotation and multiplication by one constant.

$$\text{Sum}\, Cols(X)_{i,j} = \sum_{0 \le k < s_1} X_{i,k} \quad \text{[Equation 17]}$$

In addition, the processor 250 may reduce computational complexity by using tiling, off-diagonal masking, and complexification in the matrix multiplication calculation.

In FIG. 7, matrix $\overline{B}$ is defined as a $s_0 \times b$ matrix and denotes a $(s_0/c)$ copy of an encoding matrix B that is tiled in a vertical direction. As described above, $s_0$ denotes a row of a preset size for the unit matrix, and c denotes a row of a preset size for the encoding matrix B. $\overline{B}_{epts}$, which is a complexification of matrix $\overline{B}$, may be expressed as 2 in FIG. 7.

Multiplying $i=\sqrt{-1}$ in 2 of FIG. 7 does not consume a multiplication depth for bootstrapping of the encrypted message.

The processor 250 may generate the matrix multiplication calculation results for the encoding matrix A 510 and the encoding matrix B 520 by applying the preset mask 550 to each of the plurality of generated fifth matrix data 540. That is, the processor 250 may calculate matrix multiplication A $\overline{B}^T$ by applying the preset mask 550 to each of the plurality of generated fifth matrix data 540.

As illustrated in FIG. 6, it may be confirmed that each mask 550 is implemented by sequentially converting the masking position to correspond to the arrangement position of the third matrix data 530 sequentially arranged in a preset order.

In this case, $A\overline{B}^T$ denotes a matrix including a $(s_1/c)$ copy of $A\overline{B}^T$ in a horizontal direction, and may be expressed as Equation 18 below. Here, $s_1$ denotes the column of the preset size for the unit matrix.

$$A\overline{B}^T = X + Conj(X) \quad \text{[Equation 18]}$$

Here, X is $$\sum_{0 \le k < c/2} \text{Sum}\; Cols\left(A \odot RotUp\left(\overline{B}_{cplx}, k\right)\right) \odot M_{cplx}^{(k,c)}.$$

$M^{(k,c)}$ denotes an off-diagonal masking matrix having an entry as illustrated in Equation 19 below. Conj(X) denotes calculation that outputs a complex conjugate of the input value X. For example, when the complex number X=a+bi (a, b are real numbers), Conj(X) outputs a−bi which is the complex conjugate of X.

$$M_{cplx}^{(k,c)} = \begin{cases} 1 & j \equiv i + k (\text{mod } c) \\ 0 & \text{otherwise} \end{cases} \quad \text{[Equation 19]}$$

In addition, $$M_{cplx}^{(k,c)}$$

is a complicated version of the masking matrix $$M^{(k,c)},$$

and may be expressed as Equation 20 below.

$$M_{cplx}^{(k,c)} = \frac{1}{2} M^{(k,c)} - \frac{\sqrt{-1}}{2} M^{(k+c/2,c)} \quad \text{[Equation 20]}$$

Meanwhile, in the matrix multiplication, the number of rotations becomes a bottleneck in the calculation, and the tiling may reduce this number of rotations from $O(s_0 \log s_1)$ to $O(c \log s_1)$ In addition, the complexification may reduce the complexity of the matrix by half.

The processor 250 may calculate $tAB^T$ for $t \in R$ without adding the multiplication depth by replacing the diagonal mask $$M_{cplx}^{(k,c)}$$

with $$tM_{cplx}^{(k,c)},$$

as illustrated in FIG. 6.

Referring to FIG. 6, it may be seen that two $AB^T$ matrices 560 are finally generated through the matrix multiplication calculation result.

FIG. 8 is a diagram for describing a RotLeft calculation according to an embodiment of the present disclosure.

Referring to FIG. 8, RotLeft(A, k) denotes a column circulation calculation that sequentially circulates each column in the encoding matrix A by k in a left direction.

Third matrix data A' 730 obtained through the RotLeft(A, k) calculation result may be expressed as Equation 21 below.

$$A'_{i,j} = A_{i,(j+k)\,mod\,c} \quad \text{[Equation 21]}$$

In this case, unlike the RotUp(B, k) described above, the RotLeft(A, k) consumes the multiplication depth for the bootstrapping.

Figure 11:
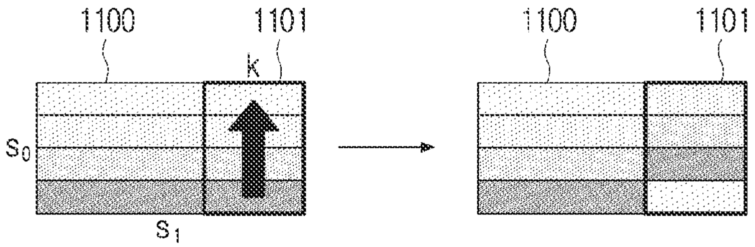
FIG. 11 is a diagram for describing an operation of circulating an encoding matrix according to an embodiment of the present disclosure.

FIG. 9 is a diagram for describing a PRotUp calculation according to an embodiment of the present disclosure, and FIG. 11 is a diagram for describing an operation for circulating an encoding matrix according to an embodiment of the present disclosure.

Referring to FIG. 9, PRotUp(B, k) for matrix B $B \in R^{a \times b}$ denotes calculation that circulates the last k column in the encoding matrix B by 1 in an upper row direction. For example, FIG. 11 illustrates the case where the encoding matrix B 1100 is a 4×8 matrix and k=3.

Referring to FIG. 11, by PRotUp(B, 3) calculation, it can be seen that a calculation has been performed to circulate a row upward by 1 for three columns (sixth column, seventh column, and eighth column) 1101 located at the right end among 8 columns in the encoding matrix B 1100 which is a 4×8 matrix.

FIG. 10 is a diagram for describing the $DiagAB^T$ calculation according to the embodiment of the present disclosure.

Referring to FIG. 10, basic homomorphic encryption (HE) calculations such as addition, multiplication, and rotation may be used for two encrypted matrices and $A \in R^{a \times b}$ $B \in R^{c \times b}$ to calculate $A^T B$.

Here, a denotes a row of a preset size, b denotes a column of a preset size, and c denotes a size of column for the matrix A.

The processor 250 may perform the encoding on the matrix B and generate the first matrix data having the row a of the preset size and the column b of the preset size. In addition, the processor 250 may perform the encoding on the matrix A and generate the second matrix data having the row a of the preset size and a column with a size of 1/n of the row a of the preset size. Likewise, n may be a natural number. In addition, for convenience of description, the following description will be based on the case where n is 2.

For example, the encrypted matrix B may be encoded to generate the encoding matrix B having an 8×8 matrix size, and the matrix A may be encoded to generate the encoding matrix A having an 8×4 matrix size.

The processor 250 may sequentially arrange a plurality of columns of the second matrix data twice in a preset column order to generate the plurality of third matrix data having the row a of the preset size and the column b of the preset size.

The encoding matrix A has half the size of the row of the encoding matrix B so that the size of the column for the matrix multiplication corresponds to the row of encoding matrix B, and may be sequentially arranged twice in the preset column order.

That is, two encoding matrices A are arranged in the left and right directions and have the column of the same size as the row of the encoding matrix B. However, when n is 3, that is, when the column of the encoding matrix A has a size of ⅓ of the row of the encoding matrix B, the encoding matrix A may be arranged three in the left-right direction to generate the plurality of third matrix data so that the plurality of third matrix data have the column of the same size as the row of the encoding matrix B.

As illustrated in FIG. 10, the processor 250 may perform the RotLeft(A, k) calculation on the encoding matrix A to sequentially arrange the encoding matrix A in the preset column order.

The processor 250 may generate the plurality of fourth matrix data, in which the homomorphic multiplication calculation between the same row and the same column is performed, using each of the plurality of generated third matrix data and the first matrix data, That is, the processor 250 performs the matrix multiplication on each of the third matrix data 730 and the first matrix data 710 calculated through the RotLeft(A, k).

Next, the processor 250 generates the plurality of fifth matrix data, in which each of a plurality of row values in the column has data obtained by homomorphically adding a plurality of row values of the corresponding column, in units of columns of each of the plurality of fourth matrix data. That is, when the result of performing the matrix multiplication of the third matrix data and the first matrix data is the matrix X which is the $s_0 \times s_1$ matrix, the processor 250 performs the SumRows(X) calculation on the matrix X.

The SumRows(X) denotes the sum of rows in each column in the matrix X, and may be expressed as Equation 22 below. The processor 250 may perform the log $s_0$ rotation to calculate the SumRows(X) without consuming the additional multiplication depth.

$$\text{Sum Rows}(X)_{i,j} = \sum_{0 \le k < s_0} x_{k,j} \quad \text{[Equation 22]}$$

The processor 250 may apply at least one of the tiling, the off-diagonal masking, and the complexification to reduce the computational complexity of DiagATB.

Here, $s_1$ denotes the column of the preset size for the unit matrix, and c denotes the column of the preset size for the encoding matrix A. $\underline{A}_{cplx}$, which is a complexfication of matrix $\underline{A}$, may be expressed as 1 in FIG. 10.

As described in FIG. 8, the RotLeft(A, k) consumes the multiplication depth, so the multiplication depth level of $\underline{A}_{cplx}$ is one level less than $\underline{A}$. Therefore, when the multiplication depth level of $\underline{A}_{cplx}$ is smaller than the multiplication depth level of the matrix B, the multiplication depth of $\underline{A}^T B$ may increase by 1.

To solve this problem, the processor 250 may perform the PRotUp calculation that consumes the multiplication depth level of matrix B instead of the multiplication depth level of the matrix A. The PRotUp calculation was previously described in FIG. 9, and therefore, redundant description will be omitted.

The processor 250 may generate the matrix multiplication calculation result for the encoding matrix A and the encoding matrix B by applying the preset mask to each of the plurality of generated fifth matrix data. That is, the processor 250 may calculate the matrix multiplication $\underline{A}^T B$ by applying the preset mask 750 to each of the plurality of generated fifth matrix data 750. In this case, $\underline{A}^T B$ may be expressed by [Equation 23] below.

$$\underline{A}^T B = X + Conj(X) \quad \text{[Equation 23]}$$

Here, X is $$\sum_{0 \le k < c/2} \text{Sum Rows}\left(Lrot\left(\underline{A}_{cplx}, k\right) \odot PRotUp(B, k)\right) \odot M_{cplx}^{(-k,a)}$$

Similar to $AB^T$, the tiling and complexification may reduce the number of rotations $A^T B$ from $O(s_0 \log s_1)$ to $O(c \log s_1)$.

Figure 12:
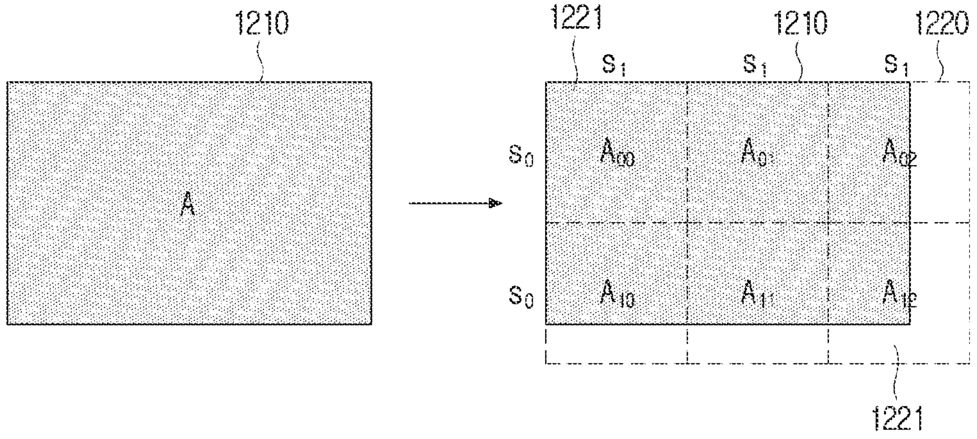
FIG. 12 is a diagram for describing the encoding matrix according to the embodiment of the present disclosure.

FIG. 12 is a diagram for describing the encoding matrix according to the embodiment of the present disclosure.

Referring to FIG. 12, for the encrypted matrix A 1210 ($A \in R^{a \times b}$) and the unit matrix in the form of $s_0 \times s_1$, when matrix A 1210 is composed of a plurality of blocks, and thus, $a > s_0$ or $b + s_1$, the processor 250 divides the encoding block 1220 into submatrices 1221 in the form of the unit matrix so that the number of rows and columns is a multiple of the rows and columns of the unit matrix, respectively.

Then, the processor 250 fills the remaining portion excluding the matrix A 1210 in the divided encoding block 1220 with 0, and encodes each divided submatrice 1221 of the encoding block 1220 by the row-major method to find the encoding matrix <A> for the matrix A 1210. Equation 24 below represents the encoding matrix <A> for the matrix A 1210.

$$<A> = \{<A>_{i,j}\}_{0 \le i < \lceil a/s_0 \rceil, 0 \le j < \lceil b/s_1 \rceil} \quad \text{[Equation 24]}$$

Here, $<A>_{i,j}$ denotes an encoding matrix of a (i, j)-th submatrice 1221. For example, referring to FIG. 12, when the encrypted input matrix A 1210 is a 13×21 matrix and the unit matrix is a 8×8 matrix, the processor 250 divides the encoding block 1220 into six partial blocks $A_{00}$, $A_{01}$, $A_{02}$, $A_{10}$, $A_{11}$, $A_{12}$ and encoded.

That is, it can be seen that two unit matrices are arranged up and down in the row direction of the encoding block 1220 so that the row of the encoding matrix is larger than 13 which is the row of the matrix A 1210, and three unit matrices are arranged left and right in the column direction of the encoding block 1220 so that the column of the encoding matrix is larger than 21 which is the column of the matrix A 1210.

In FIG. 12, each of the six partial blocks denotes a matrix in which 8×8 submatrices 1221 in the form of the unit matrix are encoded. In addition, among the six blocks of the encoding block 1220, in the case of four partial blocks $A_{02}$, $A_{10}$, $A_{11}$, and $A_{12}$ in which the matrix A 1210 is not completely filled, like the single block described above, the matrix A 1210 is filled and the zero padding is applied to the remaining positions.

In this way, a calculation device 400 according to at least one embodiment of the present disclosure may perform the matrix multiplication by extending the SumRows and SumCols calculations even for large matrices that may not be entirely contained in one encrypted message.

Figure 13:
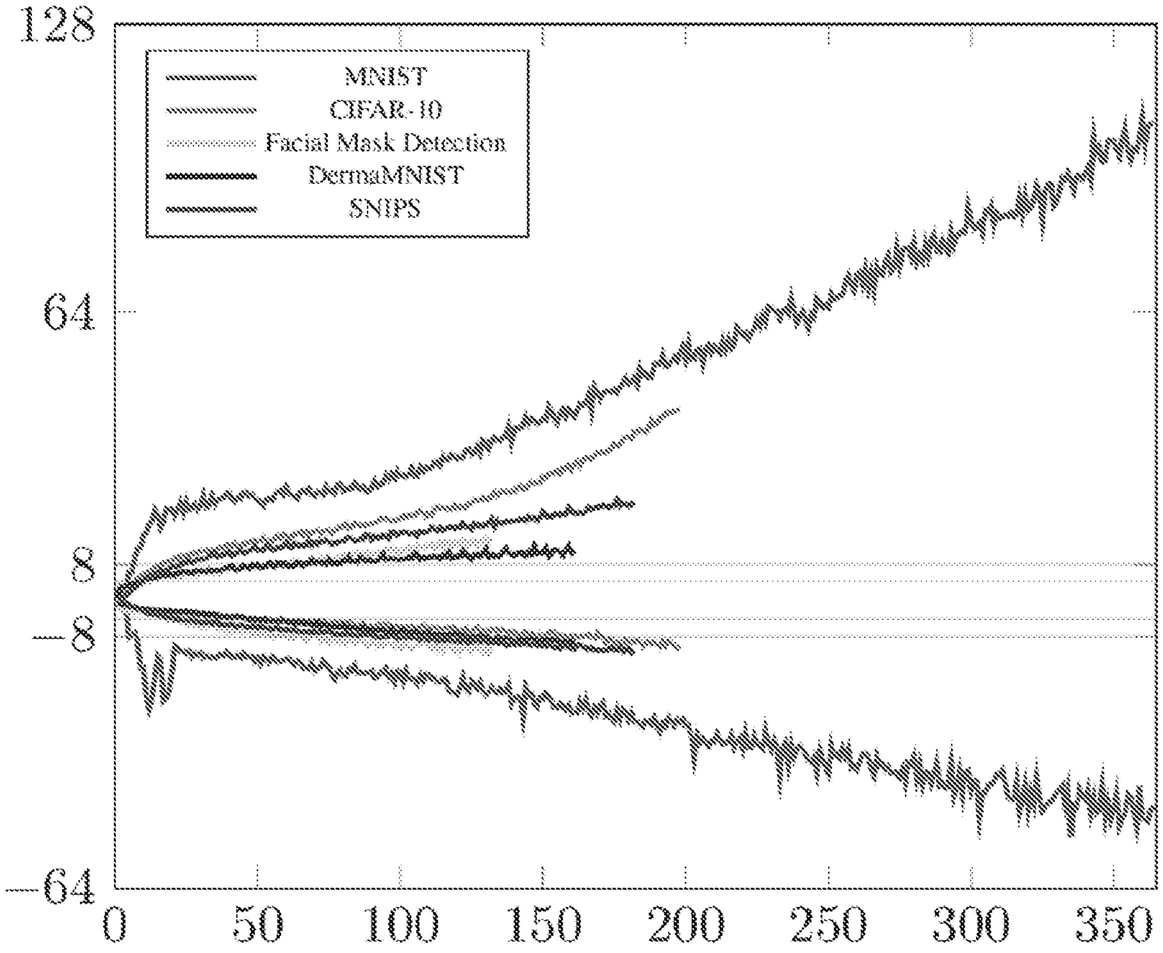
FIG. 13 is a diagram for describing performance according to an embodiment of the present disclosure.

FIG. 13 is a diagram for describing performance according to an embodiment of the present disclosure. Specifically, a simulation method in FIG. 13 uses a new softmax approximation described in this disclosure.

Referring to FIG. 13, it is illustrated how minimum and maximum values of the softmax input change as training progresses. That is, it is difficult to train a model using the existing method, but it can be seen that the training may be performed using the method according to the present disclosure.

Figure 14:
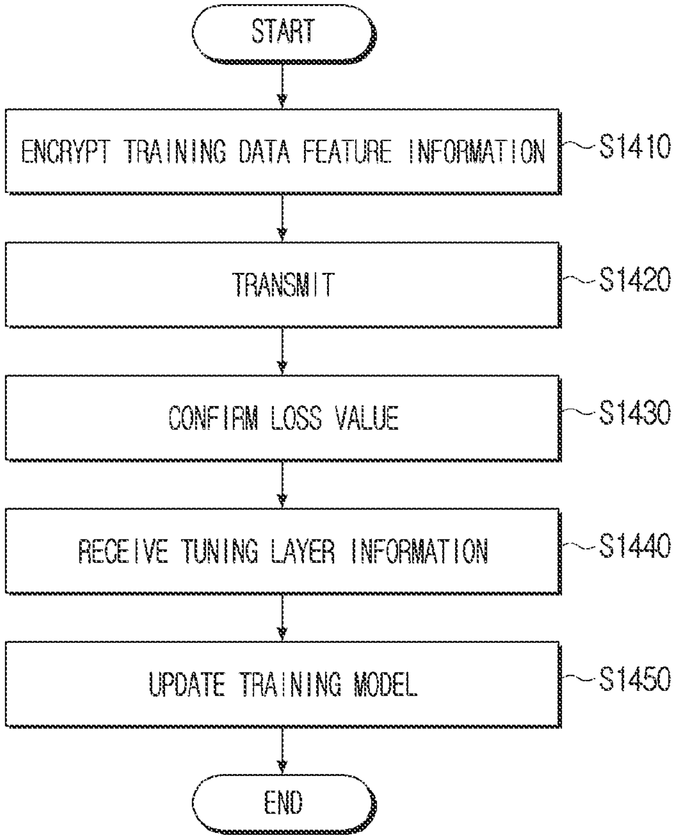
FIG. 14 is a diagram for describing an operation of processing a homomorphically encrypted message of an electronic apparatus according to an embodiment of the present disclosure.

FIG. 14 is a diagram for describing the operation of processing a homomorphically encrypted message by the electronic apparatus according to the embodiment of the present disclosure.

The features of the pre-trained training model are extracted, and each of the extracted features and training data is homomorphically encrypted (S1410).

The homomorphically encrypted features and training data are transmitted to the server apparatus (S1420).

The training on the server apparatus may be performed by transmitting this homomorphically encrypted message. However, since the training is performed in the homomorphically encrypted state, the current training state (i.e. loss value), etc., may not be confirmed on the server apparatus. In this regard, the server apparatus may transmit information for confirming the training progress state to the electronic apparatus 100 after performing the training progress in a certain unit.

For example, this information may be logit information, and the logit information may be transmitted to the electronic apparatus in the form of the homomorphically encrypted message. When such logit information is received, the electronic apparatus 100 may decrypt the logit information to confirm the loss value of the current training, and determine to proceed with additional training or stop the training on the server apparatus based on the confirmed loss value (S1430).

For this operation, the electronic apparatus may receive the homomorphically encrypted calculation result from the server apparatus, decrypt the received calculation result, and transmit the information on the training state corresponding to the decrypted value to the server apparatus.

For example, the electronic apparatus may calculate a validation loss based on the decrypted logit result and transmit training control information corresponding to the validation loss to the server apparatus. That is, the electronic apparatus may store the calculated validation loss, determine to stop training when the validation loss does not decrease for the fixed number of epochs, determine to continue training when the validation loss decreases for the fixed number of epochs, and transmit the training control information corresponding to stopping the training or continuing the training to the server apparatus.

When the training control information corresponding to stopping the training is transmitted in this way, the server apparatus 200 may transmit the homomorphically encrypted weight information.

Accordingly, when the electronic apparatus 100 receives the weight information (S1440), it may confirm the tuning layer information by decrypting the received weight information, and update the existing training model using the confirmed tuning layer information (S1450). This operation may be expressed as generating a new training model.

Figure 15:
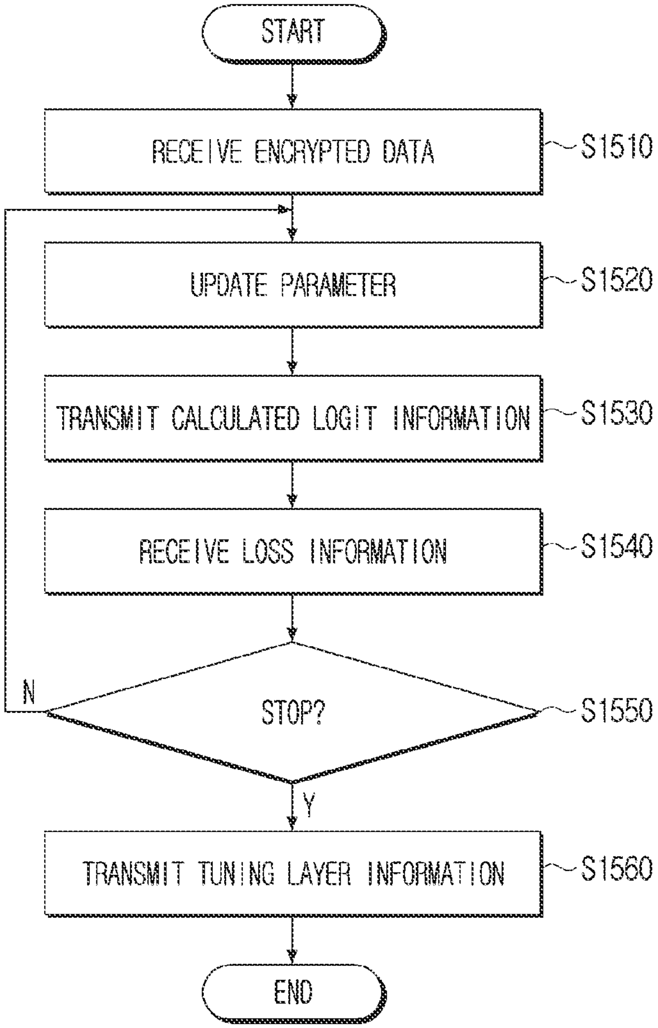
FIG. 15 is a diagram for describing the operation of processing a homomorphically encrypted message by a server according to an embodiment of the present disclosure.

FIG. 15 is a diagram for describing the operation of processing the homomorphically encrypted message by the server according to an embodiment of the present disclosure.

Referring to FIG. 15, the encrypted message in which the features of the training model are homomorphically encrypted and the homomorphically encrypted training data to be used for training the training model are received from the electronic apparatus (S1510).

The preset homomorphic operation is performed on the feature-encrypted message using the received training data to update the weight information corresponding to the training data (S1520). In this case, the weight information may be updated using the softmax calculation that uses the matrix multiplication calculation for two homomorphically encrypted messages.

The logit information corresponding to the updated weight information is calculated, and the calculated logit information is transmitted to the electronic apparatus (S1530). In this case, the logit information may be calculated using the matrix multiplication calculation for the feature-encrypted message and the updated weight information.

Accordingly, the training control information is received from the electronic apparatus (S1540). In the above, it was described that training control information (i.e., training stop and training continuation) is received, that is, the electronic apparatus 100 determines the training progress and stop, and notifies the server apparatus of the results. When implemented, the electronic apparatus 100 may transmit the loss value to the server apparatus 200 without a separate determination, and determine whether to stop or continue the training based on the loss value received from the server apparatus 200.

When training the control information corresponding to stopping the training is received (S1550-Y), the updated weight information is transmitted to the electronic apparatus. Conversely, when the training control information corresponding to continuing the training is received (S1550-N), the previous training operation may be performed repeatedly.

Meanwhile, the above-described methods according to at least some of various embodiments of the present disclosure may be implemented in a form of application that may be installed in the existing electronic apparatus.

In addition, the above-described methods according to at least some of various embodiments of the present disclosure may be implemented only by software upgrade or hardware upgrade of the existing electronic apparatus (or server apparatus).

Further, the above-described methods according to at least some of various embodiments of the present disclosure can also be performed through an embedded server included in the electronic apparatus or an external server of at least one of the electronic apparatus.

Meanwhile, according to an embodiment of the disclosure, various embodiments described above may be implemented by software including instructions stored in a machine-readable storage medium (for example, a computer-readable storage medium). A machine may be an apparatus that invokes the stored instruction from the storage medium and may be operated depending on the invoked instruction, and may include the electronic apparatus (for example, the electronic apparatus A) according to the disclosed embodiments. When a command is executed by the processor, the processor may perform functions corresponding to the command using other components directly or under the control of the processor. The command may include codes created or executed by a compiler or an interpreter. The machine-readable storage medium may be provided in a form of a non-transitory storage medium. Here, the 'non-transitory storage medium' means that the storage medium is a tangible device, and does not include a signal (for example, electromagnetic waves), and the term does not distinguish between the case where data is stored semi-permanently on a storage medium and the case where data is temporarily stored thereon. For example, the "non-transitory storage medium" may include a buffer in which data is temporarily stored. According to an exemplary embodiment, the methods according to various embodiments disclosed in the present document may be included and provided in a computer program product. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smartphones) online. In a case of the online distribution, at least some of the computer program products (for example, downloadable app) may be at least temporarily stored in a machine-readable storage medium such as a memory of a server of a manufacturer, a server of an application store, or a relay server or be temporarily created.

Various embodiments of the present disclosure may be implemented by software including instructions stored in a machine-readable storage medium (for example, a computer-readable storage medium). A machine is a device capable of invoking a stored instruction from a storage medium and operating according to the invoked instruction, and may include the electronic apparatus of the disclosed embodiments.

When the above-described command is executed by the processor, the processor may perform the function corresponding to the command using other components directly or under the control of the processor. The command may include codes created or executed by a compiler or an interpreter.

Hereinafter, although embodiments of the present disclosure have been illustrated and described, the present disclosure is not limited to the above-described specific embodiments, but may be variously modified by those skilled in the art to which the present disclosure pertains without departing from the gist of the present disclosure as disclosed in the accompanying claims. These modifications should also be understood to fall within the scope and spirit of the present disclosure.

What is claimed is:

1. An electronic apparatus, comprising:

a memory configured to store a training model trained using a plurality of training data and at least one instruction;

a communication device configured to perform communication with an external device; and a processor configured to execute the at least one instruction, wherein the processor is configured to extract a feature from the training model, generate a feature homomorphic ciphertext corresponding to an extracted feature, control the communication device to transmit the feature homomorphic ciphertext to a server apparatus, generate a plurality of training homomorphic ciphertexts corresponding to each of the plurality of training data, control the communication device to transmit the plurality of training homomorphic ciphertexts to the server apparatus, receive a result homomorphic ciphertext from the server apparatus, decrypt the result homomorphic ciphertext, and control the communication device to transmit information on a training state corresponding to the decrypted value to the server apparatus, wherein the result homomorphic ciphertext is obtained by homomorphically encrypting at least one of weight information of an updated training model based on a homomorphic ciphertext for features of the learning model and a plurality of homomorphic ciphertexts for the plurality of learning data, logit information calculated based on the weight information of the updated training model, and wherein the information on the training state includes a loss value of the learning performed using the learning data.

2. The electronic apparatus as claimed in claim 1, the processor is further configured to calculate a validation loss based on a decrypted logit result, and to control the communication device transmitting training control information corresponding to the validation loss to the server apparatus.

3. The electronic apparatus as claimed in claim 2, wherein the processor is further configured to store the calculated validation loss in the memory, determine to stop training when the validation loss does not decrease for the fixed number of epochs, determine to continue training when the validation loss decreases for the fixed number of epochs, and control the communication device transmitting the training control information corresponding to stopping the training or continuing the training to the server apparatus.

4. The electronic apparatus as claimed in claim 1, wherein when the result homomorphic ciphertext corresponds to weight information of the updated training model, the processor is further configured to decrypt the result homomorphic ciphertext, acquire a tuning layer for the training model using the weight information of the updated training model, and generate a second training model using the tuning layer information and the training model of the memory.

5. A server apparatus, comprising:

a memory;

a communication device configured to perform communication with an electronic apparatus; and a processor configured to execute the at least one instruction, wherein the processor is configured to receive a feature homomorphic ciphertext corresponding to a feature of a training model and a plurality of training homomorphic ciphertexts corresponding to each of a plurality of training data, update weight information corresponding to the training model using the plurality of training homomorphic ciphertexts, calculate logit information corresponding to the updated weight information, generate result homomorphic ciphertext by encrypting at least one of weight information of an updated training model based on a homomorphic ciphertext for features of the learning model and a plurality of homomorphic ciphertexts for the plurality of learning data, the calculated logit information calculated based on the weight information of the updated training model, control the communication device to transmit the result homomorphic ciphertext to the electronic apparatus, receive training control information includes a loss value of the learning performed using the learning data from the electronic apparatus, and determine to stop the training or continue the training based on the training control information.

6. The server apparatus as claimed in claim 5, wherein the processor controls the communication device to transmit the updated weight information to the electronic apparatus when the training control information corresponding to stopping the training is received.

7. The server apparatus as claimed in claim 5, wherein the processor is configured to calculate the logit information using a matrix multiplication calculation for the feature homomorphic ciphertext and the updated weight information.

8. The server apparatus as claimed in claim 5, wherein the processor is configured to update the weight information using a softmax calculation that uses a matrix multiplication calculation for two homomorphic ciphertexts during updating the weight information.

9. The server apparatus as claimed in claim 8, wherein the processor is configured to generate first matrix data having a row of a preset size and a column of a preset size using one of the two homomorphic ciphertexts, generate second matrix data having the row of the preset size and a column with a size of 1/n of the preset row using the other one of the two homomorphic ciphertexts, sequentially arrange a plurality of columns of the second matrix data n times in a preset column order to generate a plurality of third matrix data having the row of the preset size and the column of the preset size, generate a plurality of fourth matrix data in which a homomorphic multiplication calculation between the same row and the same column is performed using each of the plurality of generated third matrix data and the first matrix data, generate a plurality of fifth matrix data, in which each of a plurality of row values in the column has data obtained by homomorphic adding a plurality of row values of the corresponding column, in units of columns of each of the plurality of fourth matrix data, and generate a matrix multiplication calculation result for the first matrix and the second matrix by applying a preset mask to each of the plurality of generated fifth matrix data.

10. A method for processing a homomorphic ciphertext in an electronic apparatus, comprising:

storing a training model trained using a plurality of training data;

extracting a feature from training model using the training model;

generating a feature homomorphic ciphertext corresponding to an extracted feature;

generate a plurality of training homomorphic ciphertexts corresponding to each of the plurality of training data, transmitting the feature homomorphic ciphertext and the plurality of training homomorphic ciphertexts to a server apparatus, receiving a result homomorphic ciphertext from the server apparatus, decrypt the result homomorphic ciphertext, and transmitting information on a training state corresponding to the decrypted value to the server apparatus, wherein the result homomorphic ciphertext is obtained by homomorphically encrypting at least one of weight information of an updated training model based on a homomorphic ciphertext for features of the learning model and a plurality of homomorphic ciphertexts for the plurality of learning data, logit information calculated based on the weight information of the updated training model, and wherein the information on the training state includes a loss value of the learning performed using the learning data.

11. The method as claimed in claim 10, further comprising:

generating a validation loss based on the decrypted logit result, and generating training control information corresponding to the validation loss.

12. The method as claimed in claim 11, further comprising:

storing the calculated validation loss, determining stopping training when the validation loss does not decrease for the fixed number of epochs, determining continuing the training when the validation loss decreases for the fixed number of epochs, and the training control information corresponding to stopping the training or continuing the training.

13. The method as claimed in claim 10, further comprising:

receiving encrypted weight information corresponding to the training model from the server apparatus;

decrypting the received weight information;

acquiring a tuning layer for the training model using decrypted weight information; and generating a second training model using the acquired tuning layer information and the stored training model.

14. A method for processing a homomorphic ciphertext in a server apparatus, comprising:

receiving a feature homomorphic ciphertext corresponding to a feature of a training model and a plurality of training homomorphic ciphertexts corresponding to each of a plurality of training data, updating weight information corresponding to the training model using the plurality of training homomorphic ciphertexts, calculating logit information corresponding to the updated weight information, generating result homomorphic ciphertext by encrypting at least one of weight information of an updated training model based on a homomorphic ciphertext for features of the learning model and a plurality of homomorphic ciphertexts for the plurality of learning data, the calculated logit information calculated based on the weight information of the updated training model, transmitting the result homomorphic ciphertext to the electronic apparatus, receiving a training control information includes a loss value of the learning performed using the learning data from the electronic apparatus, and determining to stop the training or continue the training based on the training control information.

15. The method as claimed in claim 14, further comprising:

transmitting the updated weight information to the electronic apparatus when the training control information corresponding to stopping the training is received.

16. The method as claimed in claim 14, wherein in the calculating of the logit information, the logit information is calculated using a matrix multiplication calculation for the feature-encrypted message and the updated weight information.

17. The method as claimed in claim 14, wherein in the updating step, the weight information is updated using an activation calculation that uses a matrix multiplication calculation for two homomorphic ciphertexts.

18. The method as claimed in claim 17, wherein the matrix multiplication calculation generates first matrix data having a row of a preset size and a column of a preset size using one of the two homomorphic ciphertexts, second matrix data having the row of the preset size and a column with a size of 1/n of the preset row is generated using the other one of the two homomorphic ciphertexts, a plurality of columns of the second matrix data are sequentially arranged n times in a preset column order to generate a plurality of third matrix data having the row of the preset size and the column of the preset size, a plurality of fourth matrix data, in which a homomorphic multiplication calculation between the same row and the same column is performed, is generated using each of the plurality of generated third matrix data and the first matrix data, a plurality of fifth matrix data, in which each of a plurality of row values in the column has data obtained by homomorphic adding a plurality of row values of the corresponding column, are generated in units of columns of each of the plurality of fourth matrix data, and a matrix multiplication calculation result for the first matrix and the second matrix is generated by applying a preset mask to each of the plurality of generated fifth matrix data.

19. A system, comprising:

an electronic apparatus configured to store a plurality of training data and a training model trained using the plurality of training data; and a server apparatus configured to receive a first homomorphic ciphertexts corresponding to the plurality of training data and a second homomorphic ciphertext corresponding to a feature of the training model, and generate weight information for updating the training model and provide the generated weight information to the electronic apparatus, wherein the electronic apparatus is configured to:

extract a feature from the training model, generate the second homomorphic ciphertext corresponding to an extracted feature, transmit the second homomorphic ciphertext to the server apparatus, generate the first homomorphic ciphertexts corresponding to each of the plurality of training data, transmit the first homomorphic ciphertexts to the server apparatus, receive a result homomorphic ciphertext from the server apparatus, decrypt the result homomorphic ciphertext, and transmit information on a training state corresponding to the decrypted value to the server apparatus, acquires a tuning layer for the training model and updates the training model using the acquired tuning layer, wherein the result homomorphic ciphertext is obtained by homomorphically encrypting at least one of weight information of an updated training model based on a homomorphic ciphertext for features of the learning model and a plurality of homomorphic ciphertexts for the plurality of learning data, logit information calculated based on the weight information of the updated training model, and wherein the information on the training state includes a loss value of the learning performed using the learning data.

20. The system as claimed in claim 19, wherein the server apparatus updates the weight information using the first homomorphic encrypted message and calculates the logit information based on the updated weight information, and the electronic apparatus calculates a validation loss corresponding to the logit information and provides training control information corresponding to the validation loss to the server apparatus.

* * * * *